(12) United States Patent
Anders et al.

(10) Patent No.: US 11,077,514 B2
(45) Date of Patent: Aug. 3, 2021

(54) SYSTEMS AND METHODS TO REDUCE MAGNETIC FLUX IN A TRANSFORMER IN A SWITCHED MODE POWER SUPPLY

(71) Applicant: Illinois Tool Works Inc., Glenview, IL (US)

(72) Inventors: Adam E. Anders, Oshkosh, WI (US); Brian Schwartz, Appleton, WI (US); Andrew D. Nelson, Appleton, WI (US); Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 724 days.

(21) Appl. No.: 15/786,013

(22) Filed: Oct. 17, 2017

(65) Prior Publication Data
US 2019/0111512 A1    Apr. 18, 2019

(51) Int. Cl.
*B23K 9/10*    (2006.01)
*H02M 3/28*    (2006.01)
(Continued)

(52) U.S. Cl.
CPC .......... *B23K 9/1006* (2013.01); *B23K 9/1056* (2013.01); *B23K 11/25* (2013.01);
(Continued)

(58) Field of Classification Search
CPC .... B23K 9/1006; B23K 9/1056; B23K 11/25; H02M 1/10; H02M 1/40; H02M 3/285;
(Continued)

(56) References Cited

U.S. PATENT DOCUMENTS

| 4,439,822 A | 3/1984 | Cocconi |
| 5,446,641 A | 8/1995 | Reynolds et al. |

(Continued)

FOREIGN PATENT DOCUMENTS

WO    2016073145    5/2016

OTHER PUBLICATIONS

Int'l Search Report and Written Opinion for PCT/US2018/023507 dated Jul. 3, 2018 (15 pgs).

(Continued)

*Primary Examiner* — Phuong T Nguyen
(74) *Attorney, Agent, or Firm* — McAndrews, Held & Malloy, Ltd.

(57) ABSTRACT

Systems and methods to reduce magnetic flux in a switched mode power supply are disclosed. An example welding-type power supply includes a switched mode power supply, including a transformer configured to transform an input voltage to a welding-type voltage; switches configured to control a voltage applied to the primary winding of the transformer; a current detector configured to measure a current through the primary winding; a flux accumulator configured to determine a net flux in the transformer based on a number of volt-seconds applied to the primary winding of the transformer; and a controller configured to: control duty cycles of the switches based on the net flux; and set a value of the net flux in response to the current through the primary winding satisfying a current threshold.

20 Claims, 5 Drawing Sheets

(51) Int. Cl.
    *H02M 1/10*              (2006.01)
    *H02M 1/40*              (2007.01)
    *B23K 11/25*            (2006.01)
    *H02M 3/335*            (2006.01)
    *H02M 1/00*              (2006.01)

(52) U.S. Cl.
    CPC ............... *H02M 1/10* (2013.01); *H02M 1/40* (2013.01); *H02M 3/285* (2013.01); *H02M 3/33569* (2013.01); *H02M 2001/007* (2013.01); *H02M 2001/0074* (2013.01); *H02M 2001/0077* (2013.01)

(58) Field of Classification Search
    CPC ....... H02M 3/33569; H02M 2001/007; H02M 2001/0074; H02M 2001/0077
    USPC .............. 219/130.1, 130.21, 130.31, 130.32, 219/130.33; 363/17, 36, 44, 89, 98, 132, 363/142
    See application file for complete search history.

(56) References Cited

U.S. PATENT DOCUMENTS

| | | | |
|---|---|---|---|
| 5,756,963 | A | 5/1998 | Higgins |
| 5,824,990 | A | 10/1998 | Geissler et al. |
| 5,926,381 | A | 7/1999 | Moriguchi |
| 6,815,639 | B2 | 11/2004 | Geissler |
| 7,420,351 | B2 | 9/2008 | Grbovic |
| 9,647,555 | B2 | 5/2017 | Kooken |
| 9,855,620 | B2 | 1/2018 | Kooken |
| 9,862,052 | B2 | 1/2018 | Vogel |
| 10,500,669 | B2 | 12/2019 | Schartner |
| 2007/0070655 | A1 | 3/2007 | Eguchi |
| 2013/0088895 | A1 | 4/2013 | Ye |
| 2014/0021180 | A1 | 1/2014 | Vogel |
| 2015/0053660 | A1 | 2/2015 | Schartner et al. |
| 2015/0060426 | A1* | 3/2015 | Schartner ............... B23K 9/173 219/130.21 |
| 2015/0365005 | A1 | 12/2015 | Panov |

OTHER PUBLICATIONS

Int'l Search Report and Written Opinion for PCT/US2018/055804 dated Jan. 21, 2019 (13 pgs).

Ortiz, G., et al. Flux Balancing of Isolation Transformers and Application of "the Magnetic Ear" for Closed-Loop Volt-Second Compensation, IEEE Transactions on Power Electronics, vol. 29, No. 8, pp. 4078-4090, Aug. 2014 (14 pages).

Int'l Search Report and Written Opinion for PCT/US2019/013573 dated May 10, 2019 (21 pgs).

Int'l Search Report and Written Opinion Appln No. PCT/US2018/055804, dated Jan. 21, 2019 (11 pages).

European Office Communication Appln No. 18796325.1 dated May 11, 2021.

\* cited by examiner

SYSTEMS AND METHODS TO REDUCE MAGNETIC FLUX IN A TRANSFORMER IN A SWITCHED MODE POWER SUPPLY

BACKGROUND

The invention relates generally to welding systems and, more particularly, to systems and methods to reduce magnetic flux in a switched mode power supply.

A type of conventional welding-type power supply that is well suited for portability and for receiving different input voltages is a multi-stage system with a pre-regulator to condition the input power and provide a stable bus, and an output circuit that converts or transforms the stable bus to a welding-type output. Such conventional welding-type power supplies use transformers that are subject to magnetic saturation, which may be referred to as a volt-second rating. If the transformer is saturated, the system can become unusable.

SUMMARY

Systems and methods to reduce magnetic flux in a switched mode power supply are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
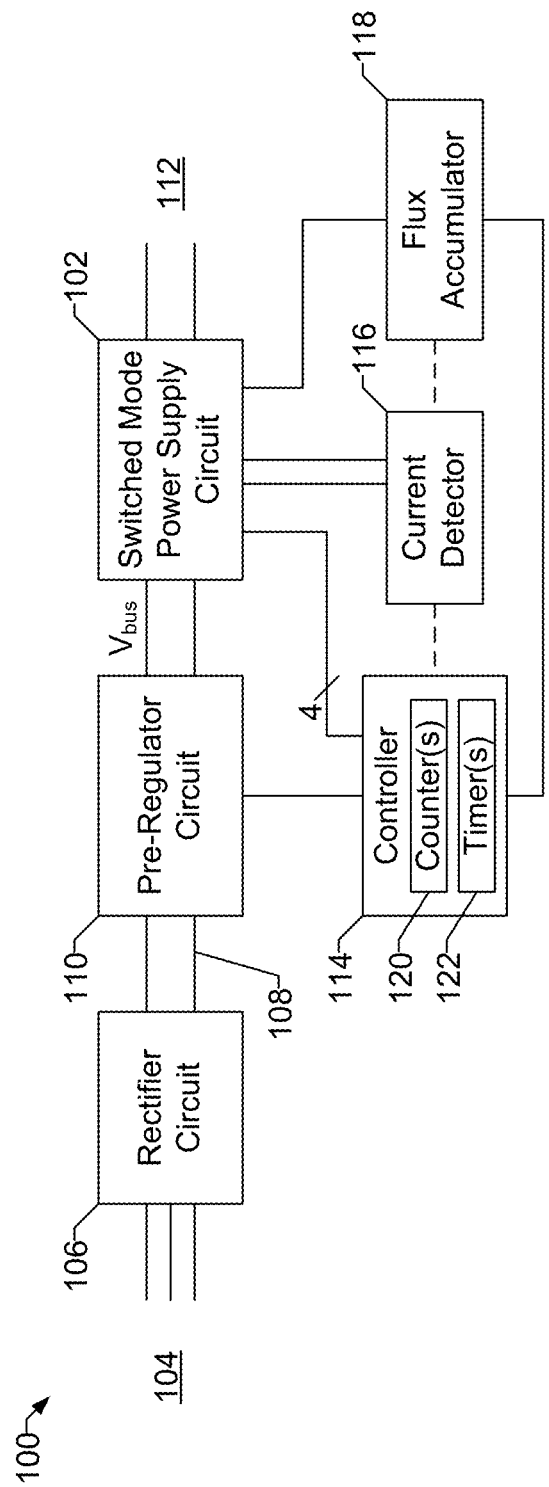
FIG. 1 is a block diagram of an example welding-type power supply, including a switched mode power supply topology, configured to estimate magnetic flux in a transformer of the switched mode power supply, in accordance with aspects of this disclosure.

Disclosed example systems and methods reduce magnetic flux in a transformer-based switched mode power supply in which the transformer has been saturated. In contrast with conventional switched mode power supplies which are controlled to stop operation in response to transformer saturation, disclosed example systems and methods enable the switched mode power supply to reduce the magnetic flux in the transformer while the switched mode power supply continues to output power. Examples are described in welding applications, which are high-voltage and high-current applications, and which enable a welder to continue to perform a weld despite the occurrence of a saturation event in the welding power supply.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "welding-type voltage" refers to a voltage suitable for welding, plasma cutting, induction heating, CAC-A, and/or hot wire welding/preheating (including laser welding and laser cladding).

As used herein, the term "positive current" through a transformer refers to a current flowing in a first direction, and the term "negative current" through the transformer refers to a current in a second direction opposite the first direction. As used herein, a "positive flux saturation value" refers to a flux saturation level that corresponds to saturation resulting from positive current. Conversely, as used herein, a "negative flux saturation value" refers to a flux saturation level that corresponds to saturation resulting from negative current.

Disclosed example welding-type power supplies include: a switched mode power supply, including a transformer configured to transform an input voltage to a welding-type voltage; switches configured to control a voltage applied to the primary winding of the transformer; a current detector configured to measure a current through the primary winding; a flux accumulator configured to determine a net flux in the transformer based on a number of volt-seconds applied to the primary winding of the transformer; and a controller configured to: control duty cycles of the switches based on the net flux; and set a value of the net flux in response to the current through the primary winding satisfying a current threshold.

In some example power supplies, the current threshold is a positive threshold current. In some such examples, the controller sets the value of the net flux to a positive flux saturation value of the transformer in response to the current through the primary winding satisfying the positive threshold current. In some example power supplies, the current threshold is a negative threshold current. In some such examples, the controller sets the value of the net flux to a negative flux saturation value of the transformer in response to the current through the primary winding satisfying the negative threshold current.

In some example power supplies, the current detector includes at least one of a current transformer, a Hall effect sensor, a sense resistor, or a magnetoresistive current sensors. In some examples, the controller controls duty cycles of the switches to reduce the value of the net flux from a saturation value while continuing to generate an output from the welding-type power supply.

In some examples, the controller counts a number of occurrences of the current through the primary winding satisfying the current threshold and, in response to the number of occurrences satisfying a threshold number, controls the switched mode power supply or the switches to stop a current output. In some examples, the controller counts a number of occurrences of the current through the primary winding satisfying the current threshold and, in response to the number of occurrences satisfying a threshold number, controls the switches to change a welding parameter. In some examples, the controller counts a number of occurrences of the current through the primary winding satisfying the current threshold and, in response to the number of occurrences satisfying a threshold number, changes at least one component of a control loop.

Disclosed example methods to control a welding-type power supply involve determining a net flux in a primary winding of a transformer of a switched mode power supply based on a number of volt-seconds applied to the primary winding of the transformer; measuring a current through the primary; and in response to the current through the primary winding satisfying a current threshold, setting a value of the net flux to indicate magnetic saturation of the transformer.

Some example methods further involve comparing the current to a positive threshold current corresponding to a positive saturation flux in the transformer. In some examples, the setting of the value of the net flux involves setting the value of the net flux to a positive flux saturation value of the transformer in response to the current satisfying the positive threshold current. Some example methods further involve comparing the current to a negative threshold current corresponding to a negative saturation flux in the transformer. In some such examples, the setting of the value of the net flux involves setting the value of the net flux to a negative flux saturation value of the transformer in response to the current satisfying the negative threshold current.

Some example methods further involve controlling duty cycles of a plurality of switches of the switched mode power supply based on the net flux, in which the duty cycles of the switches control a voltage applied to the primary winding of the transformer. Some example methods further involve controlling duty cycles of the plurality of switches of the switched mode power supply to reduce the value of the net flux from a saturation value while continuing to generate an output from the welding-type power supply.

Some example methods further involve counting a number of occurrences of the current through the primary winding satisfying the current threshold and, in response to the number of occurrences satisfying a threshold number, controlling the switched mode power supply to stop a current output. Some example methods further involve counting a number of occurrences of the current through the primary winding satisfying the current threshold, and controlling the switched mode power supply to change a welding parameter in response to the number of occurrences satisfying a threshold number. Some example methods further involve counting a number of occurrences of the current through the primary winding satisfying the current threshold, and changing at least one component of a control loop in response to the number of occurrences satisfying a threshold number.

FIG. 1 is a block diagram of an example welding-type power supply 100, including a switched mode power supply 102, configured to estimate magnetic flux in a transformer of the switched mode power supply 102. The example welding-type power supply 100 of FIG. 1 receives an AC line voltage 104 (e.g., AC single-phase or three-phase power) at a rectifier 106.

The rectifier 106 rectifies the AC line voltage 104. Example values for the AC line voltage 104 can range from 115 VAC or lower to 600 VAC. The power supply 100 may be designed for a single nominal AC line voltage and/or for a range of AC line voltages. The rectifier 106 may include a filter capacitor, and provides a rectified line voltage 108.

A pre-regulator circuit 110 provides a regulated bus voltage (e.g., $V_{bus}$), which may be regulated to a voltage greater than the peak of the rectified line voltage 108. The pre-regulator circuit 110 may also contain a power factor correction circuit and/or control to improve the power factor for the current or power drawn from the line voltage 104. The pre-regulator circuit 110 may include a boost converter circuit arrangement. Some examples may omit the pre-regulator circuit 110.

The switched mode power supply 102 receives the bus voltage $V_{bus}$ and outputs welding-type power 112. As described in more detail below, the switched mode power supply 102 includes a high frequency transformer that has a saturation point for magnetic flux.

The example power supply 100 includes a controller 114 that controls the pre-regulator circuit 110 and the switched mode power supply 102. For example, the controller 114 may control switching of a power semiconductor in the pre-regulator circuit 110 to control the regulated bus voltage $V_{bus}$. The controller 114 may control the switching of the power semiconductor in the pre-regulator circuit 110 so as to provide a regulated bus voltage $V_{bus}$ as well as to perform power factor correction.

The controller 114 is a circuit, including digital and/or analog circuitry, discrete and/or integrated circuitry, microprocessors, DSPs, etc., software, hardware and/or firmware, located on one or more circuit boards, that form part or all of a controller, and are used to control a welding process, or a device such as a power source.

Figure 2A:
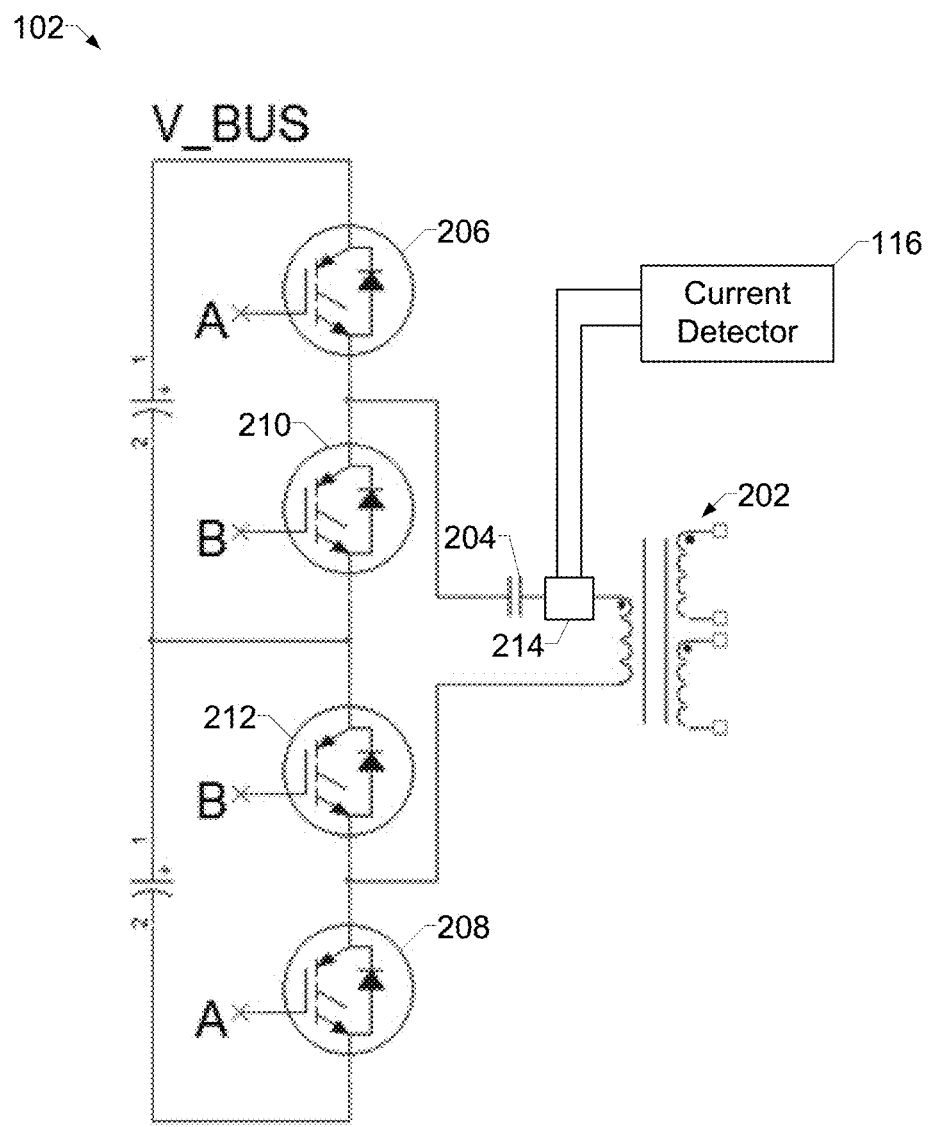
FIG. 2A is a schematic diagram of an example implementation of the switched mode power supply of FIG. 1, including a full stacked bridge topology.

FIG. 2A is a schematic diagram of an example implementation of the switched mode power supply 102 of FIG. 1, including a full stacked bridge topology. The switched mode power supply 102 of FIG. 2A receives the bus voltage $V_{bus}$, controls a voltage provided to a primary side of a high-frequency transformer 202, and outputs the welding-type power 112 from a secondary side of the transformer 202.

The switched mode power supply 102 of FIG. 2A includes a capacitor 204 in series with the high-frequency transformer 202. The capacitor 204 stands off approximately half of the bus voltage $V_{bus}$. The capacitor 204 allows for bidirectional current flow in the transformer 202, and has a voltage $V_{cap}$ across the capacitor 204. The switched mode power supply 102 further includes switching elements 206, 208, 210, 212, labeled "A" and "B" in FIG. 2A to illustrate control of the switching elements. The example switching elements 206-212 may be insulated-gate bipolar transistors (IGBTs).

The transformer 202 is driven with a positive voltage for a positive half-cycle by turning on the "A" switching elements 206, 208, which applies a voltage equal to $V_{bus} - V_{cap}$ to the primary of the transformer 202. A negative half-cycle is accomplished by turning on the "B" switching elements 210, 212, which applies a voltage equal to $-V_{cap}$ to the primary of the transformer 202. The nominal value of $V_{cap}$ is $V_{bus}/2$, so the positive and negative half-cycles both nominally apply voltages of $V_{bus}/2$, with opposite polarities for the different half-cycles. In each of the positive half-cycle and the negative half-cycle, the magnetic flux in the core of the transformer 202 changes in accordance with the applied voltage and current. When the positive half-cycle and the negative half-cycle are on for the same lengths of time, the net magnetic flux (volt-seconds) applied to the transformer 202 is zero over the course of one period (i.e., one positive half-cycle and one negative half-cycle). The transformer 202 has a volt-second rating that is can withstand before it saturates. While the flux is balanced, the switched mode power supply 102 avoids saturating the transformer 202.

The example switched mode power supply 102 pre-biases the capacitor 204 to have a capacitor voltage $V_{cap}$ of half the bus voltage $V_{bus}$ (e.g., using balancing resistors before the switched mode power supply 102 is enabled to provide an output). The capacitance value of the example capacitor 204 is such that the capacitor voltage $V_{cap}$ may only change by a few volts above and below one half the bus voltage $V_{bus}$ at twice the switching frequency of the switching elements 206-212 (e.g., a PWM frequency) under normal circumstances. However, under dynamic load conditions, or current commands, the capacitor 204 may deviate farther from its nominal voltage.

Figure 2B:
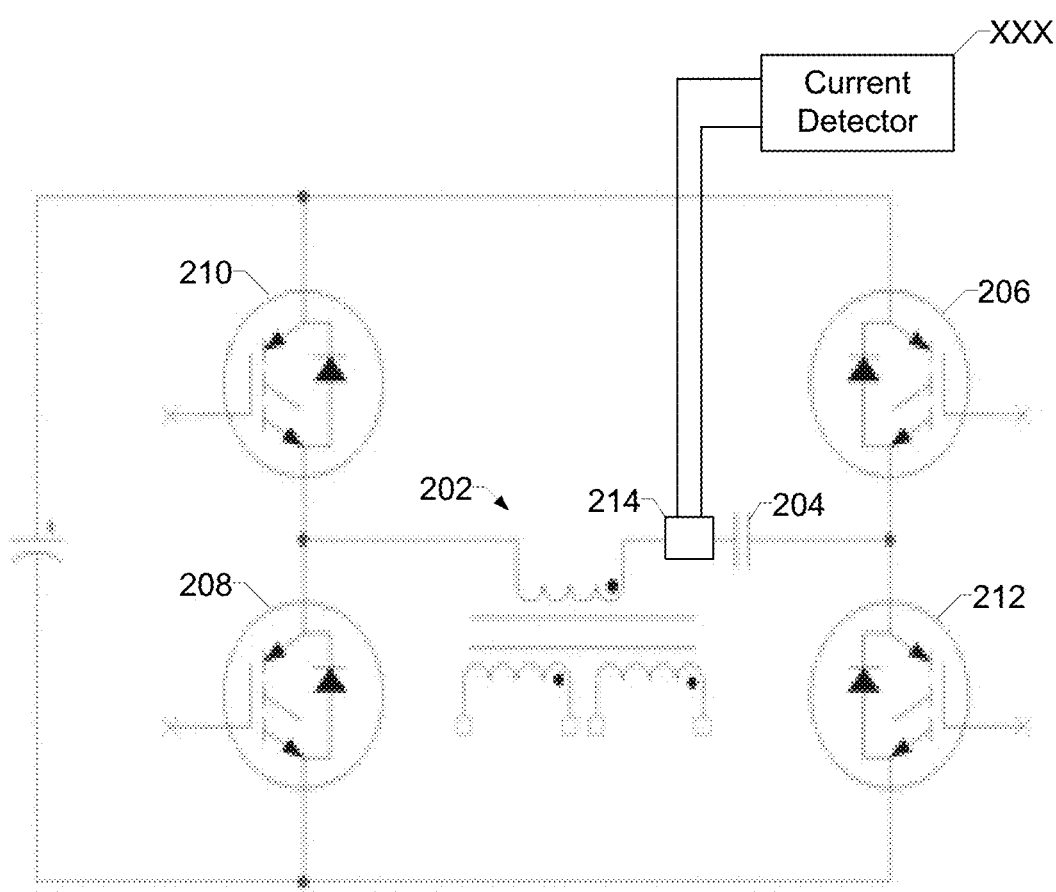
FIG. 2B is a schematic diagram of an example implementation of the switched mode power supply of FIG. 1, including a full bridge topology.

FIG. 2B is a schematic diagram of another example implementation of the switched mode power supply 102 of FIG. 1, including a full bridge topology. The switched mode power supply 102 of FIG. 2B includes the transformer 202, the capacitor 204, and the switching elements 206, 208, 210, 212.

Figure 2C:
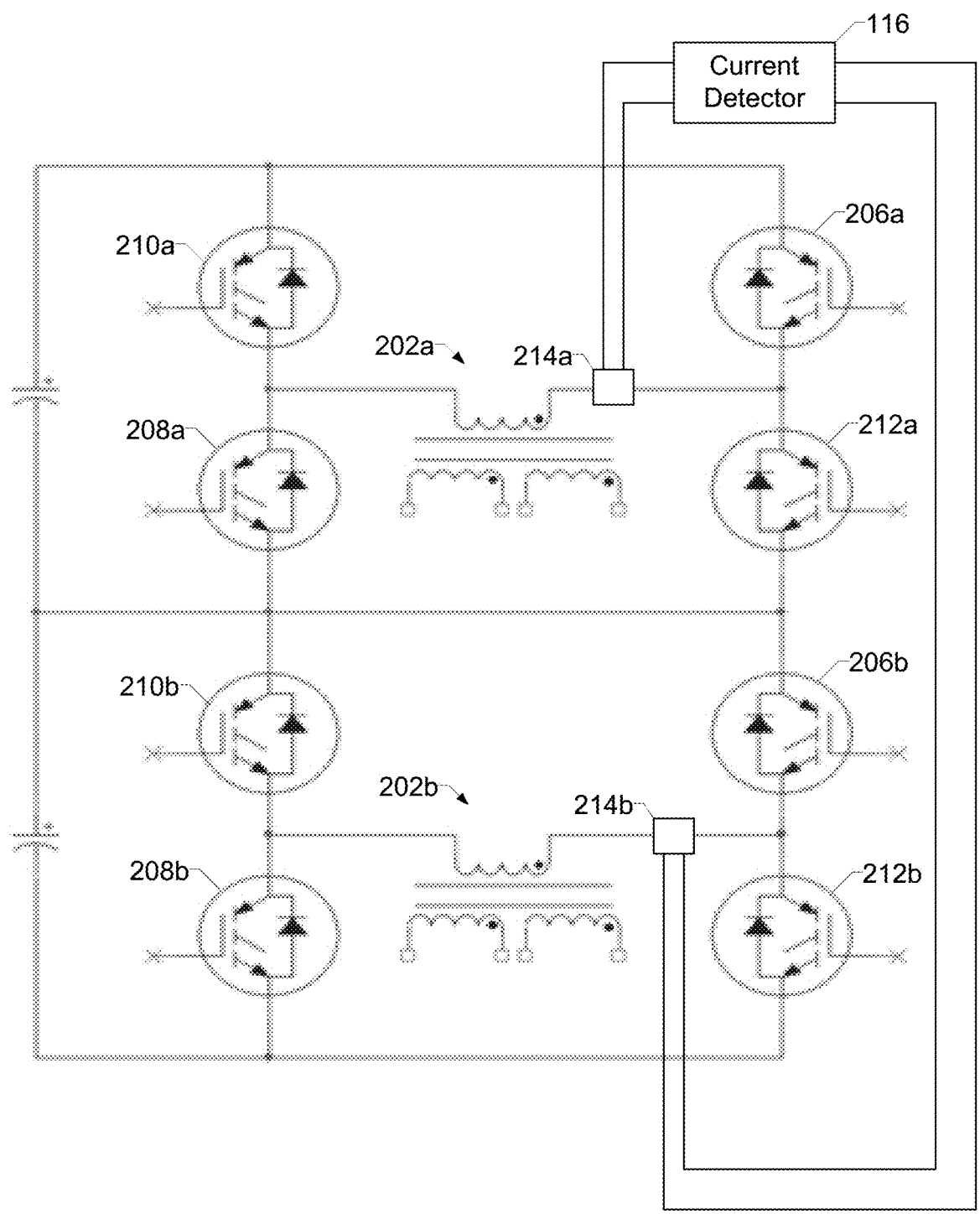
FIG. 2C is a schematic diagram of an example implementation of the switched mode power supply of FIG. 1, including a stacked dual full bridge topology.

FIG. 2C is a schematic diagram of another example implementation of the switched mode power supply 102 of FIG. 1, including a stacked dual full bridge topology. The dual stacked full bridge topology includes two instances of the full bridge topology illustrated in FIG. 2B. Each of the instances includes the transformer (e.g., transformers 202a, 202b) and the switching elements (e.g., switching elements 206a, 206b, 208a, 208b, 210a, 210b, 212a, 212b).

While the example topologies of FIGS. 2A and 2B include the series capacitor 204, any of the example topologies of FIGS. 2A, 2B, and/or 2C may be implemented with or without the series capacitor(s).

Returning to FIG. 1, the controller 114 employs three techniques to avoid transformer saturation in the switched mode power supply 102. A flux accumulator 118 determines a net flux in the transformer 202 applied to the primary winding of the transformer 202 and/or to a series combination of the capacitor 204 and the transformer 202 when such a capacitor 204 is present. As used herein, the term "net flux" refers to an accumulation (e.g., integration, summation, etc.) of volt-seconds in a core of the transformer 202 over one or more processing cycles of the flux accumulator 118 (e.g., a half switching cycle, a whole switching cycle, multiple switching cycles, etc.). For example, the flux accumulator 118 may integrate the flux in the transformer 202 to maintain history of the net flux (e.g., volt*sec) that has been applied to the transformer 202. In some examples, the flux accumulator 118 tracks the PWM values output by the controller 114 to the switching elements 206-212. The flux accumulator 118 calculates the net flux by adding the positive PWM value and subtracting the negative PWM value, to a running accumulator.

A first technique is an instantaneous flux limit that restricts the duty cycle in either polarity to an upper limit, thereby limiting an amount of flux that can be added or removed from the transformer 202 in any given cycle. A second technique is flux balancing, which limits how quickly applied flux can change, to keep the positive and negative current cycles closer to balancing on an instantaneous basis, to thereby avoid exceeding the volt-second rating of the transformer 202 in a single direction. For example, if the switched mode power supply 102 is running operating at a 5% duty cycle, and is commanded to change to 40% duty cycle to satisfy a changing load condition, the controller 114 executing the control loop will not change the duty cycle to 40% on the next PWM. Instead, the controller 114 increases it in uniform or non-uniform increments (e.g., 15%, 25%, 35%, 40%) until the desired command duty cycle is reached over several PWM cycles.

A third technique is a flux centering algorithm. The controller 114 continually sums up the flux applied to the transformer 202 during each switching period. Dynamically, the controller 114 permits the flux to accumulate up to the volt-second limit of the transformer. However, controller 114 performs flux centering to slowly modify the duty cycles of either the "A" or "B" pairs of switching elements 206-212 to bring the accumulated flux closer to zero. The flux centering reduces or avoids incremental increase of the flux in the transformer 202 to either positive or negative saturation by maintaining the flux to be generally centered at or near zero.

The controller 114 runs the three techniques above in open-loop control, in that the controller 114 monitors the flux based on the commanded PWM duty cycles, but not on measured flux in the transformer. If the switched mode power supply 102 experiences variation in semiconductor switch timing, transformer characteristics, and/or some other PWM distortion, the flux accumulator 118 does not have information about the actual volt-seconds applied to the transformer to predict and/or proactively prevent saturation of the transformer. Additionally, in the stacked topology, if a series capacitor (e.g., the capacitor 204 of FIG. 2A) is not charged to V_BUS/2, asymmetrical voltage can be applied. In some examples, there is no information about the voltage on the capacitor 204, so the flux accumulator 118 is unable to account for asymmetrical voltage. Any of the foregoing circumstances can lead to eventual saturation of the transformer 202 without the flux accumulator 118 detecting the saturation.

For example, if the bus is at 600V, and the series capacitor 204 is at 310V, the voltage applied to the transformer 202 during the positive half cycle is 290V, and the voltage applied to the transformer during the negative half cycle is 310V. This example imbalance results in a volt-second mismatch applied to the transformer 202. The flux accumulator 118 assumes that 300V (e.g., half of the bus voltage) is applied in both half cycles, so the flux accumulator 118 does not see the imbalance. If the capacitor 204 remains imbalanced for several PWM cycles, a net volt-second imbalance can accumulate and the transformer 202 can be driven into saturation. In conventional systems, saturation is detected by an overcurrent detection and results in an overcurrent trip shutdown of the welding power source.

The example power supply 100 of FIG. 1 includes a current detector 116 to measure a current through the primary winding of the transformer 202 in the switched mode power supply 102. The current detector 116 detects a primary overcurrent by measuring the current in the transformer 202 primary and comparing the current to one or more threshold currents. The threshold current may be positive or negative, and/or an absolute value of the current (e.g., amperage irrespective of current direction) may be compared to an amperage threshold, to detect that the transformer 202 is saturated. An example threshold current may be a current level that is greater than an expected peak current level that would occur during normal operation of the transformer 202 under load.

To measure the current, the example current detector 116 of FIG. 2A, FIG. 2B, and/or FIG. 2C includes a current transducer 214, such as a current transformer, a Hall effect sensor, a series resistor and voltmeter, magnetoresistive current sensors, and/or any other type of current measurement device. The current transducer 214 provides a signal to the current detector 116 that is proportional to the current through the primary winding of the transformer 202, and the current detector 116 measures the signal to determine the current.

If an overcurrent is detected, the current detector 116 provides an overcurrent signal to the flux accumulator 118 and/or to the controller 114. The controller 114 may turn switching elements 206-212 off to prevent further increase in the primary current. The saturation can occur in either the positive or negative half cycle, depending on the direction in which the flux was accumulated. While the current detector 116 may compare a current level to a threshold irrespective of the current direction, when an overcurrent is detected, the current detector 116 indicates to the flux accumulator 118 the direction in which the overcurrent or saturation occurred.

Based on the overcurrent signal, the example controller 114 sets the flux level in the flux accumulator 118 to a predetermined flux saturation level based on a direction of the current. For example, if a positive overcurrent is detected, the net flux value stored in the flux accumulator 118 is set to a positive saturation flux. Conversely, if a negative overcurrent is detected, the net flux value stored in the flux accumulator 118 is set to a negative saturation flux.

After updating the net flux value, the example controller 114 uses one or more of the techniques described above to reduce the net flux closer to zero. For example, the controller 114 may adjust and control the duty cycles of individual ones and/or pairs of the switching elements 206-212 to reduce the net flux in the transformer 202 while the flux accumulator 118 continues to monitor the net flux. In contrast with conventional power supplies, the example power supply 100 may continue to output welding-type power despite the occurrence of a saturation event (e.g., without terminating a welding-type process).

The example power supply 100 may continue operating when transformer saturation occurs due to inaccurate tracking of flux by the flux accumulator 118 due to transient events. However, other causes for transformer saturation and/or other conditions may be present that could cause the transformer 202 to repeatedly saturate or otherwise cause detection of an overcurrent event. For example, short-circuiting of an output diode on a secondary side of the transformer 202 could result in overcurrent events. To detect frequent saturation, the example controller 114 may include one or more counter(s) 120 and one or more timer(s) 122, which are used by the controller 114 to detect when a threshold number of saturation events occur within corresponding time periods. Example time periods may be relatively short (e.g., between 10 ms and 500 ms) and/or longer (e.g., between 500 ms and 10 seconds), with corresponding count thresholds.

If the counter 120 reaches a threshold number within a threshold time period determined by the timer 122, the example controller 114 takes corrective action. The corrective action may be based on the count and/or the time period during which the count was detected. An example corrective actions include stopping an output of the power supply 100. For example, the controller 114 may shut down (e.g., discontinue output from) the switched mode power supply 102 if two consecutive pulses, or two out of three consecutive pulses, trip the overcurrent limit, because such an event may be likely to only happen if there is an improper or failed component in the power supply 100, and continuing to supply output from the power supply 100 would not be beneficial.

Another example corrective action may include changing one or more variables and/or constants used by the controller 114 for the flux centering control loop(s), such as a control loop gain variable, a limit variable such as a flux limit, a positive/negative flux balance bias, and/or any other control loop variable based on the specific control loop algorithm and the impact of the control loop algorithm variables and/or constants on aspects of the switched mode power supply 102. For example, the controller 114 may identify and implement a change to a weld process if multiple saturation events occur over a time period of several seconds or more, because the multiple saturation events could indicate that an aspect of the weld process is exciting a condition that leads to transformer saturation. In such a case, the example controller 114 may slightly retune the process (e.g., via control loop variables) away from the operating point at which saturation repeatedly occurred, to help eliminate the conditions driving the transformer to saturation (e.g., with little or no impact on the weld).

Another example corrective action may include the controller 114 changing one or more welding parameters, such as voltage, current, frequency, and/or other welding parameters, by controlling the switching elements 206-212.

Figure 3:
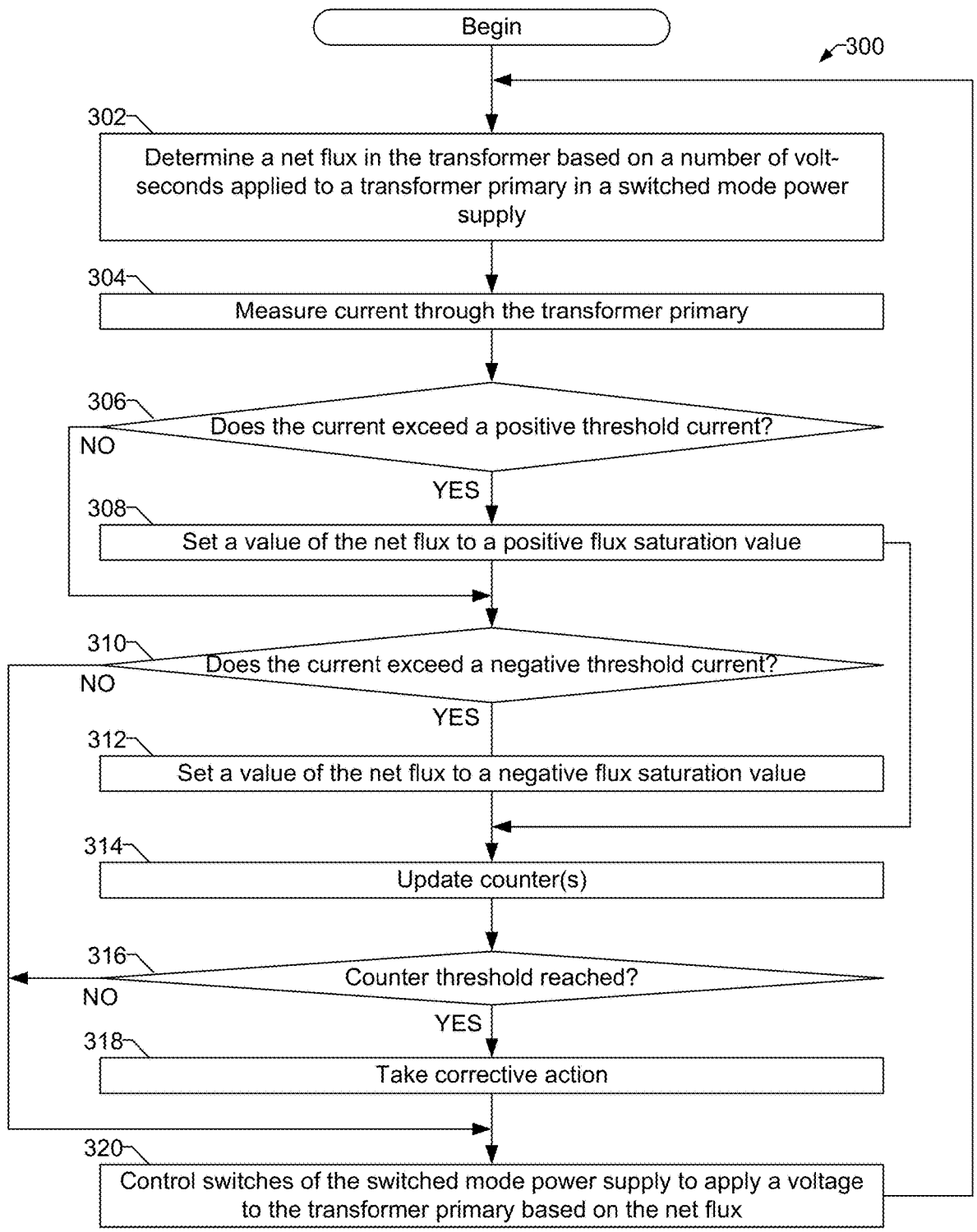
FIG. 3 is a flowchart representative of example method that may be performed by the example welding-type power supply of FIG. 1 to reduce magnetic flux in a transformer of a switched mode power supply in the welding-type power supply.

FIG. 3 is a flowchart representative of example method 300 that may be performed by the example welding-type power supply 100 of FIG. 1 to reduce magnetic flux in a transformer of the switched mode power supply 102 in the welding-type power supply 100. The example method 300 will be described with reference to the example power supply 100 of FIG. 1 and the switched mode power supply 102 illustrated in FIG. 2A. However, the method 300 may be implemented using the switched mode power supplies illustrated in FIGS. 2B and/or 2C.

At block 302, the flux accumulator 118 of FIG. 1 determines a net flux in the transformer 202 based on a number of volt-seconds applied (e.g., by the switching elements 206-212) to the primary winding of the transformer 202.

At block 304, the example current detector 116 (e.g., via the current transducer 214) measures the current through the transformer primary 304. In some examples, the current detector 116 continually measures the current through the primary winding, which may end if a threshold current (e.g., an overcurrent) is detected. In other examples, the current detector 116 measures a peak current through the primary winding at each half-cycle.

At block 306, the example current detector 116 determines whether the measured current exceeds a positive threshold current. The positive threshold current may be greater than a peak expected current corresponding to positive voltage across the primary winding during normal operation. If the measured current exceeds the positive threshold current (block 306), at block 308 the controller 114 (or the flux accumulator 118) sets a value of the net flux (at the flux accumulator 118) to a positive flux saturation value.

If the measured current does not exceed the positive threshold current (block 306), at block 310 the example current detector 116 determines whether the measured current exceeds a negative threshold current. The negative threshold current may be greater than a peak expected current corresponding to negative voltage across the primary winding during normal operation. If the measured current exceeds the negative threshold current (block 310), at block 308 the controller 114 (or the flux accumulator 118) sets a value of the net flux (at the flux accumulator 118) to a negative flux saturation value.

After setting the value of the net flux (at the flux accumulator 118) to the positive flux saturation value (block 308) or to the negative flux saturation value (block 312), at block 314 the controller 114 updates the counter(s) 120 and/or the timer(s) 122. For example, the controller 114 may increment one or more of the counter(s) to indicate an overcurrent event and/or reset one or more of the timer(s) 122. At block 316, the example controller 114 determines whether one or more counter threshold(s) have been reached. If a counter threshold has been reached (block 316), at block 318 the controller 114 takes corrective action. Example corrective actions may be based on which of multiple counters 120 has met a corresponding counter threshold, and may include shutting down the power supply 100, updating one or more variables and/or constant(s) in the control loop, and/or adjusting one or more aspects of a weld process being performed.

If the current has not exceeded either the positive threshold current (block 306) or the negative threshold current (block 310), or if the counter threshold has not been reached (block 316), at block 320 the example controller 114 controls the switching elements 206-212 of the switched mode power supply 102 to apply a voltage to the transformer primary based on the net flux. For example, if the net flux has been set to a positive flux saturation value or a net flux saturation value, the controller 114 may control the switching elements 206-212 to reduce the net flux (closer to zero) over multiple switching cycles while continuing to output power from the power supply 100.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a switched mode power supply, including a transformer configured to transform an input voltage to a welding-type voltage;
   switches configured to control a voltage applied to the primary winding of the transformer;
   a current detector configured to measure a current through the primary winding;
   a flux accumulator configured to determine a net flux in the transformer based on a number of volt-seconds applied to the primary winding of the transformer; and
   a controller configured to:
      control duty cycles of the switches based on the net flux;
      receive a signal representative of the current through the primary winding measured by the current detector; and
      set a value of the net flux to a predetermined net flux value in response to the current through the primary winding satisfying a current threshold, wherein the current threshold is at least one of a positive threshold current or a negative threshold current.

2. The welding-type power supply as defined in claim 1, wherein the current threshold is the positive threshold current.

3. The welding-type power supply as defined in claim 2, wherein the controller is configured to set the value of the net flux to a positive flux saturation value of the transformer in response to the current through the primary winding satisfying the positive threshold current.

4. The welding-type power supply as defined in claim 1, wherein the current threshold is a negative threshold current.

5. The welding-type power supply as defined in claim 1, wherein the current detector comprises at least one of a current transformer, a Hall effect sensor, a sense resistor, or a magnetoresistive current sensor.

6. The welding-type power supply as defined in claim 1, wherein the controller is configured to control duty cycles of the switches to reduce the value of the net flux from a saturation value while continuing to generate an output from the welding-type power supply.

7. The welding-type power supply as defined in claim 1, wherein the controller is configured to count a number of occurrences of the current through the primary winding satisfying the current threshold and, in response to the number of occurrences satisfying a threshold number, control the switched mode power supply or the switches to stop a current output.

8. The welding-type power supply as defined in claim 1, wherein the controller is configured to count a number of occurrences of the current through the primary winding satisfying the current threshold and, in response to the number of occurrences satisfying a threshold number, control the switches to change a welding parameter.

9. The welding-type power supply as defined in claim 1, wherein the controller is configured to count a number of occurrences of the current through the primary winding satisfying the current threshold and, in response to the number of occurrences satisfying a threshold number, change at least one component of a control loop.

10. A welding-type power supply, comprising:
a switched mode power supply, including a transformer configured to transform an input voltage to a welding-type voltage;
switches configured to control a voltage applied to the primary winding of the transformer;
a current detector configured to measure a current through the primary winding;
a flux accumulator configured to determine a net flux in the transformer based on a number of volt-seconds applied to the primary winding of the transformer; and
a controller configured to:
control duty cycles of the switches based on the net flux;
receive a signal representative of the current through the primary winding measured by the current detector;
determine whether the current through the primary winding satisfies a current threshold, the current threshold comprising at least one of a positive threshold current or a negative threshold current; and
set a value of the net flux in response to the current through the primary winding satisfying the current threshold, wherein the controller is configured to at least one of set the value of the net flux to a positive flux saturation value of the transformer in response to the current through the primary winding satisfying the positive threshold current or set the value of the net flux to a negative flux saturation value of the transformer in response to the current through the primary winding satisfying the negative threshold current.

11. A method to control a welding-type power supply, comprising:
transforming an input voltage to a welding-type voltage via a transformer having a primary winding and a secondary winding;
controlling switches to control a voltage applied to the primary winding of the transformer;
determining a net flux in a primary winding of a transformer of a switched mode power supply based on a number of volt-seconds applied to the primary winding of the transformer;
measuring a current through the primary winding using a current detector; and
in response to the current through the primary winding measured by the current detector satisfying a current threshold, setting a value of the net flux to indicate magnetic saturation of the transformer, wherein the current threshold is at least one of a positive threshold current or a negative threshold current.

12. The method as defined in claim 11, further comprising comparing the current to the positive threshold current corresponding to a positive saturation flux in the transformer.

13. The method as defined in claim 12, wherein the setting of the value of the net flux comprises setting the value of the net flux to a positive flux saturation value of the transformer in response to the current satisfying the positive threshold current.

14. The method as defined in claim 11, further comprising comparing the current to the negative threshold current corresponding to a negative saturation flux in the transformer.

15. The method as defined in claim 14, wherein the setting of the value of the net flux comprises setting the value of the net flux to a negative flux saturation value of the transformer in response to the current satisfying the negative threshold current.

16. The method as defined in claim 11, further comprising controlling duty cycles of a plurality of switches of the switched mode power supply based on the net flux, the duty cycles of the switches controlling a voltage applied to the primary winding of the transformer.

17. The method as defined in claim 11, further comprising controlling duty cycles of the plurality of switches of the switched mode power supply to reduce the value of the net flux from a saturation value while continuing to generate an output from the welding-type power supply.

18. The method as defined in claim 11, further comprising:
counting a number of occurrences of the current through the primary winding satisfying the current threshold; and
in response to the number of occurrences satisfying a threshold number, controlling the switched mode power supply to stop a current output.

19. The method as defined in claim 11, further comprising:
counting a number of occurrences of the current through the primary winding satisfying the current threshold; and
controlling the switched mode power supply to change a welding parameter in response to the number of occurrences satisfying a threshold number.

20. The method as defined in claim 11, further comprising:
counting a number of occurrences of the current through the primary winding satisfying the current threshold; and
changing at least one component of a control loop in response to the number of occurrences satisfying a threshold number.

* * * * *